United States Patent [19]

Itoh et al.

[11] 4,376,184

[45] Mar. 8, 1983

[54] RUBBER COMPOSITIONS OF ETHYLENE-PROPYLENE ELASTOMERS

[75] Inventors: Kunio Itoh; Toshimichi Oshima; Nobuyuki Uesugi, all of Annaka, Japan

[73] Assignee: Shin-Etsu Chemical Co., Ltd., Tokyo, Japan

[21] Appl. No.: 238,683

[22] Filed: Feb. 27, 1981

[30] Foreign Application Priority Data

Feb. 25, 1980 [JP] Japan .................................. 55-23524

[51] Int. Cl.$^3$ ........................ C08K 3/36; C08L 23/16; C08L 83/06
[52] U.S. Cl. .................................... 524/492; 524/506; 525/105; 525/106; 525/282; 525/479
[58] Field of Search .............................. 525/105, 106; 260/37 SB; 524/492, 506

[56] References Cited

U.S. PATENT DOCUMENTS

| | | | |
|---|---|---|---|
| 4,201,698 | 5/1980 | Itoh et al. | 525/105 |
| 4,265,801 | 5/1981 | Moody et al. | 525/105 |
| 4,268,637 | 5/1981 | Weldy | 525/105 |

*Primary Examiner*—Wilbert J. Briggs, Sr.
*Attorney, Agent, or Firm*—Toren, McGeady and Stanger

[57] ABSTRACT

The invention provides a novel rubber composition based on an ethylene-propylene copolymeric rubbery elastomer and curable by hot air vulcanization under atmospheric pressure giving great advantages over conventional ones vulcanizable only under pressure. The inventive rubber composition comprises, in addition to the ethylene-propylene copolymeric rubbery elastomer, an oganopolysiloxane gum having alkenyl or mercapto groups in the molecule, a reinforcing silica filler, an organic compound having at least two maleimido groups in a molecule and a curing agent which is an organic peroxide or an organic sulfur compound.

3 Claims, No Drawings

RUBBER COMPOSITIONS OF ETHYLENE-PROPYLENE ELASTOMERS

BACKGROUND OF THE INVENTION

The present invention relates to a rubber composition or, more particularly, a rubber composition curable by hot air vulcanization under atmospheric pressure based on an ethylene-propylene copolymeric rubber.

As is well known, rubber compositions formulated with an ethylene-propylene copolymeric rubbery elastomer are susceptible to the vulcanization both with an organic peroxide and with sulfur or an organic sulfur compound as the vulcanizing agent. They can be shaped into various forms of shaped rubber articles by the techniques of compression molding in a metal mold, extrusion molding with an extruder machine and other conventional molding methods. Shaped and cured articles of ethylene-propylene copolymeric rubbers have found wide applications in a variety of fields in recent years such as the parts of automobiles, insulating covering of electric wires, gaskets in buildings and the like including general-purpose rubber sheets by virtue of their excellent heat resistance, anti-cold resistance, electric characteristics and the like.

The vulcanization of these rubbers is characteristically performed always under pressurized condition as is the case in the above mentioned vulcanization processes. Needless to say about the compression molding, the vulcanization in the extrusion molding is also performed with a pressurized steam in general in the molding process for manufacturing electric wires, tubes and any other extruded products having irregular cross sections.

One of the problems in the vulcanization with pressurized steam is that the temperature of the steam available in most of the rubber processing factories is 200° C. at the highest or, in general, in the range from 150° to 170° C. Even though the pressure of the steam in the above temperature range is sufficient for the vulcanization of the rubbers, the temperature per se is not always sufficently high to give a velocity of vulcanization desired from the standpoint of productivity. That is, the velocity of steam vulcanization is unduly low in comparison with the velocity of extrusion from the die of an extruder machine so that, when the extrusion and steam vulcanization must be continuously and successively carried out as in the manufacturing of rubber insulated electric wires, sufficient productivity is obtained only in facilities equipped with a very low vulcanization tube constructed with large expenses since otherwise the velocity of extrusion cannot be so high and the overall productivity is greatly reduced with the velocity of the vulcanization as the rate determining step.

Moreover, the steps of extrusion and vulcanization sometimes cannot be performed continuously and successively depending on the forms of the extruded materials so that the steps must be practiced separately and, needless to say, the productivity is far from satisfactory.

On the other hand, several rubbery elastomers are known to be vulcanizable by heating in hot air under atmospheric pressure. For example, silicone rubbers formulated with certain kinds of vulcanizing agents are vulcanized when heated at a high temperature of, usually, 250° C. or higher for an extremely short period of time under atmospheric pressure by passing through a zone of hot air atmosphere following extrusion from the extruder die continuously. If desired, the temperature of the hot air zone can be further increased to 350° to 400° C. without particular difficulties so as that the time for the vulcanization is further shortened and, as a consequence, the velocity of extrusion is further increased contributing to a great improvement of the productivity as well as a decrease of the costs for the vulcanization facilities to an incomparably lower extent than for the facilities for the steam vulcanization.

There has recently been disclosed that the temperature of vulcanization of the ethylene-propylene copolymeric rubbers can be decreased when the vulcanizing agent is cumene hydroperoxide combined with a cobalt or chromium compound (see Nippon Gomu Kyokai Shi, volume 51 (1978), No. 5, page 274) but, even in this method, the vulcanization must be carried out under pressure with high temperature steam and hot air vulcanization under atmospheric pressure cannot be undertaken as in the vulcanization of silicone rubbers. In addition, the above mentioned vulcanizing agent is susceptible to ionic decomposition when the rubber composition is formulated with a strongly acidic filler such as clay or silica and the radical reaction necessary for the crosslinking reaction is sometimes hindered so that the desired vulcanization of the rubber is retarded all the more.

SUMMARY OF THE INVENTION

An object of the present invention is therefore to provide a novel and improved rubber composition capable of being vulcanized under atmospheric pressure such as the vulcanization in hot air (HAV), vulcanization in a hot liquid medium (HLV) or vulcanization in a fluidized bed (FBV).

Another object of the invention is to provide a rubber composition composed mainly of an ethylene-propylene copolymeric rubbery elastomer and capable of being vulcanized in hot air under atmospheric pressure even when formulated with a reinforcing silica filler.

The rubber composition of the present invention comprises
(a) 100 parts by weight of a mixture composed of
  (a-1) from 40 to 99% by weight of an ethylene-propylene copolymeric rubbery elastomer and
  (a-2) from 60 to 1% by weight of an organopolysiloxane gum having an average degree of polymerization of at least 1000 and containing at least one alkenyl group or a mercapto group in a molecule,
(b) from 10 to 150 parts by weight of a reinforcing silica filler having a specific surface area of at least 50 $m^2/g$,
(c) from 0.5 to 10 parts by weight of an organic compound having at least 2 maleimido groups in a molecule, and
(d) from 0.1 to 10 parts by weight of a curing agent.

The rubber composition composed of the above described components (a) to (d) is advantageous since the vulcanization thereof can be performed under atmospheric pressure by heating in hot air at a temperature of 250° C. or higher in a short time without the failure of blistering or the like. The vulcanization of the rubber composition can be completed so rapidly that any conventional extruder machines and vulcanization tubes can be utilized as such at a high rate of extrusion so that the costs for the vulcanization are greatly reduced. In addition, the vulcanization obtained with the inventive rubber compositions retain and exhibit excellent properties inherently possessed by the ethylene-propylene copolymeric rubbery elastomers even by the formulation of one or more of rather unconventional components.

DETAILED DESCRIPTION OF THE PREFERRED EMBODIMENTS

The rubbery components, i.e. component (a), in the inventive rubber composition is a mixture of an ethylene-propylene copolymeric rubbery elastomer and a specific organopolysiloxane gum in a limited proportion.

Various kinds of hitherto known ethylene-propylene copolymeric rubbery elastomers are suitable in the invention such as so-called ethylene-propylene rubbers (EPR), ethylene-propylene-diene terpolymeric rubbers (EPDM) and the like. The propylene-content in these ethylene-propylene copolymeric rubbers is usually in the range from 10 to 70% by moles or, in most of commercially available products, from 15 to 50% by moles and the average molecular weight thereof is about 1 to $2 \times 10^5$. As the ethylene content in these rubbers increases, the crystallinity of the rubber polymer is increased leading to higher mechanical strengths of the green bodies as well as the vulcanized elastomers. It is general that the ethylene-propylene copolymeric rubber is a ternary copolymer with a dienic third monomer component such as dicyclopentadiene, ethylidenenorbornene, 1,4-hexadiene and the like.

The organopolysiloxane gum of which the rubbery component (a) of the inventive composition is composed in combination with the above described ethylene-propylene copolymeric rubbery elastomer is a high molecular diorganopolysiloxane having an average degree of polymerization of at least 1000 and containing at least one or, preferably, at least two alkenyl groups such as vinyl and allyl groups and/or mercapto groups in a molecule. When the average degree of polymerization of the diorganopolysiloxane gum is smaller than 1000, the Mooney viscosity of the resultant rubber composition is unduly low so that the vulcanized shaped article will suffer from blistering or internal voids formed in the course of hot air vulcanization under atmospheric pressure.

The position at which the alkenyl and/or mercapto groups are bonded to the diorganopolysiloxane molecule is not particularly limitative and may be at the chain terminal or intermediate position in the molecular chain. It is of course that these groups, in particular, mercapto group, are not necessarily bonded to the silicon atoms directly but may be bonded to the silicon atoms through a divalent hydrocarbon group therebetween.

The organic groups bonded to the silicon atoms in the diorganopolysiloxane gum other than the alkenyl groups and the mercapto containing groups are preferably all methyl groups or a combination of methyl groups and phenyl groups. When phenyl groups are included, it is preferable that at least 70% by moles of the organic groups be methyl groups.

The method for the preparation of the above described diorganopolysiloxane gum is well known in the art of silicones starting with corresponding diorganodichlorosilanes and need not be described here in detail.

The proportion of the ethylene-propylene copolymeric rubbery elastomer and the diorganopolysiloxane gum in the component (a) of the inventive composition is such that the component (a) is composed of from 40 to 99% by weight of the former and from 60 to 1% by weight of the latter. When the amount of the diorganopolysiloxane gum exceeds 60% by weight, the resultant vulcanized shaped article may sometimes contain foams or voids formed in the course of vulcanization and the mechanical strengths of the vulcanizates are undesirably low so that the practical advantages of the invention are largely lost.

The component (b) in the inventive rubber composition is a reinforcing silica filler such as the so-called fumed silica and precipitated silica filler conventionally formulated in silicone rubbers and the like. The silica filler should have a sufficiently large specific surface area of at least 50 m²/g or, preferably, at least 100 m²/g in order to obtain sufficiently high mechanical strengths of the vulcanizate articles. Silica fillers having a specific surface area of 100 to 300 m²/g are readily available as a commercial product and may be used as such. It should be noted that difficulties are encountered in uniformly dispersing a silica filler having an excessively large specific surface area in the rubbery component. The methods for the preparation of these fumed and precipitated silica fillers are well known in the art and need not be described here in detail.

These reinforcing silica fillers are, in addition to the physicochemical activity by the large surface area thereof, also chemically active and hydrophilic exhibiting acidity owing to the presence of a large number of silanolic hydroxy groups on the surface. When desired, the surface of the silica fillers may be rendered hydrophobic by blocking the silanolic hydroxy groups in the treatment with an organochlorosilane or organosilazane. The hydrophobic treatment mentioned above is advantageous in eliminating several drawbacks caused by the silanolic hydroxy groups on the surface with decreased silanol activity although, on the contrary, disadvantageous owing to the remarkably increased expensiveness of the filler as well as to the decreased effect of reinforcement and decreased elastic modulus as a result of the weakened bonding strength between the filler surface and the elastomer molecules. Accordingly, it should be determined in consideration of the particular object of the use of the finished vulcanizate rubber article whether the reinforcing silica filler to be used is a surface-treated one as mentioned above or an untreated one.

The amount of this reinforcing silica filler as the component (b) is determined in the range from 10 to 150 parts by weight or, preferably, from 30 to 80 parts by weight per 100 parts by weight of the rubber component as the component (a). An amount smaller than 10 parts by weight cannot give sufficient reinforcing effect while an extreme difficulty is encountered when the filler in an amount in excess of 150 parts by weight is desired to be incorporated into the rubber component and, if ever possible, the resultant vulcanizate rubber article has no sufficiently high mechanical strengths.

The component (c) is an organic compound having at least two maleimido groups, i.e. groups expressed by the formula

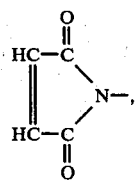

in a molecule and, otherwise, has no particular limitation. This compound serves as a crosslinking agent by virtue of the —C=C— double bonds in the maleimido groups. Several of the particular examples of the organic compounds as the component (c) are as given by the following structural formulas.

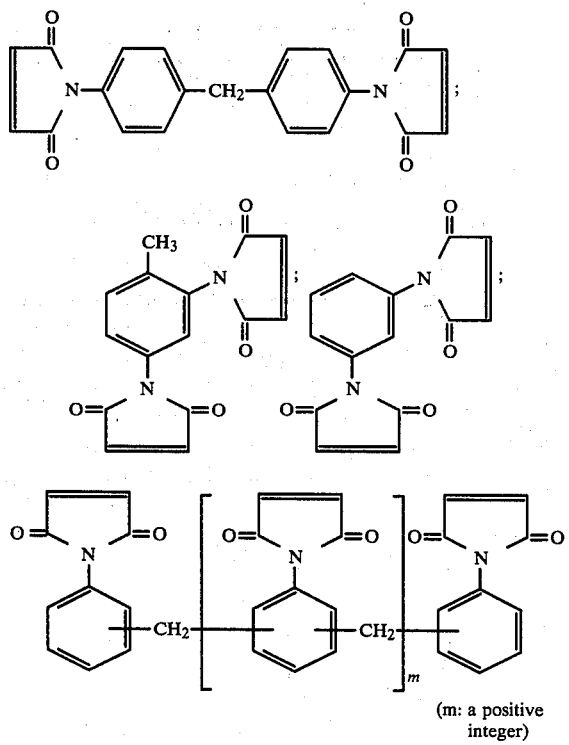

(m: a positive integer)

It is known to formulate the maleimido-containing organic compound as a crosslinking agent in a rubber composition based on the ethylene-propylene copolymeric rubbery elastomer when enhanced elastic modulus or improvement in the permanent compression set is desired in the vulcanizate rubber article (see, for example, H. J. Stern "Rubber, Natural and Synthetic", P. 240, Maclaren, London, 1967) although no satisfactory vulcanization under atmospheric pressure can be achieved by the formulation of the maleimido-containing organic compound alone.

The component (d) is a curing agent including sulfur, organic sulfur compounds and organic peroxides. Suitable organic sulfur compounds are exemplified by zinc dibutyldithiocarbamate, dibenzothiazyl disulfide, 2-mercaptobenzothiazol, tetramethylthiuram monosulfide, tetraethylthiuram disulfide, dipentamethylenethiuram tetrasulfide, 2-mercaptobenzoimidazol, zinc dimethyldithiocarbamate and the like. Suitable organic peroxides are exemplified by benzoyl peroxide, 2,4-dichlorobenzoyl peroxide, dicumyl peroxide, 2,5-dimethyl bis(2,5-di-tert-butylperoxy)hexane, di-tert-butyl peroxide, tert-butyl perbenzoate and the like.

These curing agents may be used either alone or a combination of two kinds or more in accordance with particular object of the vulcanizate article.

The amount of this component (d) in the inventive composition is necessarily in the range from 0.1 to 10 parts by weight per 100 parts by weight of the component (a).

The inventive rubber composition is prepared by uniformly blending the above components (a) to (d) and it is advisable that the components (a), (b) and (c) above are first blended in a suitable blending machine such as a Banbury mixer, kneader, intermixer, two-roll mill and the like and the thus compounded mixture is then admixed with the component (d) in a predetermined amount to give a rubber composition vulcanizable by hot air vulcanization under atmospheric pressure. The conditions for blending together the components should be adequately modified according to the formulation. When the silica filler as the component (b) or other optional fillers contain too much moisture, they are preferably dried in advance prior to blending with the other components by heatng. Alternatively, a ready-blended rubber composition may be heated at a temperature of about 100° C. to remove moisture contained therein.

The thus prepared rubber composition is vulcanizable by heatng in hot air at a temperature of 250° C. or higher so as that the desired vulcanization is completed within a relatively short time.

The inventive rubber composition may be formulated, in addition to the above described components (a) to (d), with other additive ingredients conventionally used in rubber compositions such as inorganic or organic fillers other than reinforcing silica fillers, e.g. titanium dioxide, aluminum oxide, zinc oxide, iron oxide and other metal oxides, carbon black, graphite powder, calcium carbonate, mica powder, clay, talc, quartz powder, diatomaceous earth, baryta, aluminum hydroxide and the like, flame retardants, coloring agents, mold-release agent, ultaviolet absorbers, dispersing aids, process oils, lubricants, e.g. higher fatty acids such as stearic acid and lauric acid, and various kinds of carbon-functional silane compounds.

The rubber composition of the invention is particularly suitable for the insulating material of electric wires and as a material of extrusion molding of tubes and other extrudates having irregular cross sections and remarkably improved productivity is obtained with the inventive rubber composition in comparison with conventional rubber compositions of similar types.

In the following, examples of the present invention are given to illustrate the rubber compositions in further detail. In the examples, parts are all given by parts by weight.

EXAMPLE 1

A base compound was prepared in a two-roll mill by uniformly blending 70 parts of an ethylene-propylene copolymeric rubbery elastomer (EP 43, a product name by Nippon EP Rubber Co.), 30 parts of a methylvinylpolysiloxane gum having an average degree of polymerization of about 6,000 and composed of 99.5% by moles of dimethylsiloxane units and 0.5% by moles of methylvinylsiloxane units, 5 parts of zinc oxide, 50 parts of a fumed silica as a reinforcing filler having a specific surface area of 200 m²/g (Aerosil 200, a product name by Nippon Aerosil Co.), 5 parts of a methylphenylpolysiloxane terminated with hydroxy groups at both chain ends as expressed by the formula

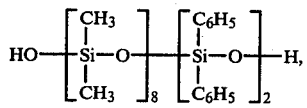

1 part of stearic acid, 2.5 parts of bis(triethoxysilylpropyl) tetrasulfide and 15 parts of a process oil. This base compound is called Compound A hereinafter.

Another base compound, called Compound B hereinafter, was prepared with the same formulation as above except that the methylvinylpolysiloxane gum was omitted and, instead, the amount of the ethylene-propylene copolymeric rubber was increased to 100 parts.

Several rubber compositions were prepared with either one of the above Compound A, Compound B and a mixture of the Compounds A and B by admixing N,N'-m-phenylene bismaleimide and dicumyl peroxide (DICUP 40C, a tradename) in amounts as indicated in Table 1 below and each of the thus prepared rubber compositions was shaped into a sheet of 5 mm thickness, which was heated for 5 minutes in a hot air oven at 250° C.

The thus obtained sheets were examined for the condition of the cross section as well as the surface condition after standing for 24 hours in atmospheric air. The results are shown in Table 1.

TABLE 1

| Experiment No. | 1 | 2 | 3* | 4* | 5* | 6* |
|---|---|---|---|---|---|---|
| Compound A, parts | 100 | 50 | 100 | 100 | — | — |
| Compound B, parts | — | 50 | — | — | 100 | 100 |
| N,N'—m-phenylene bismaleimide, parts | 1 | 2 | — | — | — | 2 |
| Dicumyl peroxide, parts | 4 | 4 | 4 | 6 | 4 | 4 |
| Condition of sheet section | Good | Good | Blister | Blister | Blister | Blister |
| Surface condition after 24 hours | Good | Good | Uncured | Uncured | Uncured | Uncured |

*Comparative example

EXAMPLE 2

A base compound was prepared in a kneader by uniformly blending 80 parts of an ethylene-propylene copolymeric rubbery elastomer (EP 3045, a product name by Mitsui Petrochemical Co.), 20 parts of a diorganopolysiloxane gum having an average degree of polymerization of about 6000 and composed of 96.6% by moles of dimethylsiloxane units, 3.0% by moles of diphenylsiloxane units and 0.4% by moles of 3-mercaptopropylmethylsiloxane units, 10 parts of zinc oxide, 60 parts of a reinforcing silica filler having a specific surface area of 180 m²/g (Nipsil VN3, a product name by Nippon Silica Co.), 1 part of stearic acid, 17 parts of a process oil and 3 parts of an α,ω-dihydroxydimethylpolysiloxane having an average degree of polymerization of about 10 followed by heating for 1 hour in an atmosphere of nitrogen at 120° C. to remove the moisture contained in the blend. This base compound is called Compound C hereinafter.

In parallel, another base compound, called Compound D hereinafter, was prepared with the same formulation as in Compound C except that the diorganopolysiloxane gum was omitted and, instead, the amount of the ethylene-propylene copolymeric rubbery elastomer was increased to 100 parts.

Several rubber compositions were prepared with either one of the above prepared Compound C, Compound D and a mixture thereof by admixing N,N'-(2,4-tolylene)dimaleimide and dicumyl peroxide in amounts indicated in Table 2 below and each of the rubber composition was extruded with an extruder machine for rubber of L/D=12 into a rod of 5 mm diameter immediately followed by hot air vulcanization under atmospheric pressure at 250° C. for 3 minutes. The thus vulcanized rubber rod was examined for the condition of the section as cured and the surface condition after standing for 24 hours in atmospheric air. The results are shown in Table 2.

TABLE 2

| Experiment No. | 7 | 8 | 9* | 10* | 11* |
|---|---|---|---|---|---|
| Compound C, parts | 100 | 50 | 100 | — | — |
| Compound D, parts | — | 50 | — | 100 | 100 |
| N,N'—(2,4-tolylene)dimaleimide, parts | 1 | 1 | — | — | 2 |
| Dicumyl peroxide, parts | 4 | 4 | 4 | 5 | 5 |
| Condition of rod section | Good | Good | Blister | Blister | Blister |
| Surface condition after 24 hours | Good | Good | Uncured | Uncured | Fair |

*Comparative example

What is claimed is:

1. A curable rubber composition which comprises
   (a) 100 parts by weight of a mixture composed of
      (a-1) from 40 to 99% by weight of an ethylene-propylene copolymeric elastomer, and
      (a-2) from 60 to 1% by weight of an organopolysiloxane gum having an average degree of polymerization of at least 1000 and containing at least one alkenyl group in a molecule,
   (b) from 10 to 150 parts by weight of a reinforcing silica filler having a specific area of at least 50 m²/g,
   (c) from 0.5 to 10 parts by weight of N,N'-m-phenylene bismaleimide or N,N'-(2,4-tolylene)dimaleimide,
   (d) from 0.1 to 10 parts by weight of a curing agent.
2. The curable rubber composition as claimed in claim 1 wherein the propylene content in the ethylene-propylene copolymeric rubbery elastomer is in the range from 10 to 70% by moles.
3. The curable rubber composition as claimed in claim 1 wherein the curing agent is selected from the class consisting of sulfur, organic sulfur compounds and organic peroxides.

* * * * *